US011124232B2

(12) United States Patent
Chen et al.

(10) Patent No.: US 11,124,232 B2
(45) Date of Patent: Sep. 21, 2021

(54) INTEGRATED TRANSPORT SYSTEMS WITH KINGPIN STEERING

(71) Applicant: Deere & Company, Moline, IL (US)

(72) Inventors: Jixin Chen, East Moline, IL (US); Michael L. Vandeven, East Moline, IL (US)

(73) Assignee: Deere & Company, Moline, IL (US)

( * ) Notice: Subject to any disclaimer, the term of this patent is extended or adjusted under 35 U.S.C. 154(b) by 116 days.

(21) Appl. No.: 16/427,647

(22) Filed: May 31, 2019

(65) Prior Publication Data

US 2020/0055545 A1    Feb. 20, 2020

Related U.S. Application Data

(60) Provisional application No. 62/764,936, filed on Aug. 15, 2018.

(51) Int. Cl.
*B62D 7/18*    (2006.01)
*A01D 75/00*    (2006.01)
(Continued)

(52) U.S. Cl.
CPC ............... *B62D 7/18* (2013.01); *A01B 69/005* (2013.01); *A01B 69/007* (2013.01);
(Continued)

(58) Field of Classification Search
CPC ........ B62D 7/18; A01D 34/30; A01D 75/002; A01D 41/142; A01D 41/16; A01B 69/005; A01B 73/06; A01B 69/007; A01B 73/005

See application file for complete search history.

(56) References Cited

U.S. PATENT DOCUMENTS

| 1,880,121 A | 9/1932 | Chadbourne |
| 2,174,493 A | 9/1939 | Vanderwerf |

(Continued)

FOREIGN PATENT DOCUMENTS

| CA | 1188899 A | 6/1985 | |
| CA | 2750951 A1 * | 8/2012 | ........... A01B 69/006 |

(Continued)

OTHER PUBLICATIONS

Unverferth Mfg.—All-Wheel Steer Fieldrunner Header Transport, Nov. 29, 2010, https://www.youtube.com/watch?v=ynmmrAkKsj8.

(Continued)

*Primary Examiner* — Karen Beck
(74) *Attorney, Agent, or Firm* — Foley & Lardner LLP

(57) ABSTRACT

A road transport system of a header of a harvesting machine includes two pairs of wheels and two wheel frames. Each wheel frame is connected to a pair of wheels. The two wheel frames are rotatable between a field operation position and a road transport position. A header of a harvesting machine includes two pairs of wheels and two wheel frames. Each wheel frame is connected to a pair of wheels. The two wheel frames are rotatable between a field operation position and a road transport position. A method of converting a header of a harvesting machine from a field operation mode to a road transport mode includes: releasing wheel frames of the header from the header; rotating the wheel frames from a field operation position to a road transport position; and enabling kingpin steering connections between at least one of the wheel frames and a pair of wheels.

19 Claims, 9 Drawing Sheets

(51) Int. Cl.
*A01B 73/00* (2006.01)
*A01B 69/00* (2006.01)
*A01B 73/06* (2006.01)
*A01B 69/06* (2006.01)

(52) U.S. Cl.
CPC ............ *A01B 73/005* (2013.01); *A01B 73/06* (2013.01); *A01D 75/002* (2013.01)

(56) References Cited

U.S. PATENT DOCUMENTS

| | | | |
|---|---|---|---|
| 2,630,670 A | | 3/1953 | Sherman |
| 3,212,793 A | | 10/1965 | Pietroroia |
| 3,245,695 A | * | 4/1966 | Bernard ............... A01D 75/002 280/400 |
| 3,721,461 A | * | 3/1973 | Nelsen ................. A01B 73/005 172/1 |
| 4,460,193 A | * | 7/1984 | Dietz ................... A01D 67/005 172/248 |
| 4,603,873 A | | 8/1986 | Perlini |
| 4,824,135 A | | 4/1989 | McGregor |
| 5,243,810 A | * | 9/1993 | Fox ...................... A01B 73/005 56/14.4 |
| 5,477,937 A | | 12/1995 | Chagnon |
| 5,529,447 A | * | 6/1996 | Bruns .................. A01D 75/002 410/156 |
| 5,904,365 A | | 5/1999 | Dillon |
| 6,209,297 B1 | * | 4/2001 | Yeomans ............. A01B 73/005 56/14.9 |
| 7,197,865 B1 | * | 4/2007 | Enns .................... A01B 73/005 56/228 |
| 7,874,571 B2 | | 1/2011 | Frey et al. |
| 7,926,249 B1 | * | 4/2011 | Cook ................... A01D 75/002 56/228 |
| 7,926,833 B2 | | 4/2011 | Hellbusch |
| 8,769,920 B2 | * | 7/2014 | Patterson ............. A01D 75/002 56/228 |
| 8,870,210 B2 | | 10/2014 | Smith |
| 8,931,797 B2 | | 1/2015 | Gaerke et al. |
| 9,179,591 B2 | * | 11/2015 | Barnett ................ A01B 69/003 |
| 9,370,977 B2 | | 6/2016 | Sallis, Sr. |
| 9,840,277 B1 | | 12/2017 | Beech |
| 10,021,823 B2 | * | 7/2018 | Honey ................. A01D 75/002 |
| 10,457,324 B1 | | 10/2019 | Hellbusch |
| 2008/0086999 A1 | | 4/2008 | Tippery et al. |
| 2009/0145097 A1 | | 6/2009 | Priepke |
| 2009/0145264 A1 | | 6/2009 | Priepke |
| 2009/0273160 A1 | | 11/2009 | Friggstad et al. |
| 2012/0217723 A1 | | 8/2012 | Smith |
| 2014/0151977 A1 | | 6/2014 | Gaerke et al. |
| 2015/0091274 A1 | | 4/2015 | Bojsen |
| 2018/0192582 A1 | | 7/2018 | Lounder et al. |
| 2020/0053949 A1 | * | 2/2020 | Chen ................... A01B 69/007 |

FOREIGN PATENT DOCUMENTS

| | | | | |
|---|---|---|---|---|
| DE | 2132135 | A1 | 2/1972 | |
| DE | 34 31 554 | A1 | 3/1986 | |
| EP | 0603843 | A1 | 6/1994 | |
| EP | 3395156 | A1 | 10/2018 | |
| EP | 3669624 | A1 * | 6/2020 | ............ B62D 13/04 |
| EP | 3669625 | A1 * | 6/2020 | .......... A01B 73/005 |
| FR | 501303 | A | 4/1920 | |
| FR | 3008276 | A1 | 1/2016 | |
| GB | 1291382 | A | 10/1972 | |
| NL | 8303420 | A | 5/1985 | |

OTHER PUBLICATIONS

European Search Report issued in counterpart European Patent Application No. 20155286.6 dated Jul. 9, 2020 (07 pages).
European Search Report issued in European Patent Application No. 19192513.0 dated Jan. 22, 2020 (6 pages).
European Search Report issued in counterpart European Patent Application No. 19191038.9 dated Jan. 30, 2020 (11 pages).

* cited by examiner

US 11,124,232 B2

INTEGRATED TRANSPORT SYSTEMS WITH KINGPIN STEERING

CROSS-REFERENCE TO RELATED PATENT APPLICATIONS

This application claims the benefit of the U.S. Provisional Patent Application No. 62/764,936, filed Aug. 15, 2018, which is incorporated herein by reference in its entirety.

FIELD OF THE DISCLOSURE

The present application relates generally to transport systems. More specifically, the present disclosure relates to transport systems of a harvesting machine that is integrated with a kingpin steering system.

BACKGROUND

A harvesting machine generally includes a header and a vehicle (e.g., a tractor) for carrying the header. One end of the header is attached to the vehicle. The other end of the header includes ground wheels for supporting the vehicle in movement across the ground. When the header needs to be transported to another location after the harvesting operation, the header is detached from the vehicle and a trailer is usually used for transporting the header.

SUMMARY OF THE DISCLOSURE

One embodiment of the present disclosure relates to a road transport system of a header of a harvesting machine. The road transport system includes two pairs of wheels and two wheel frames. Each wheel frame is connected to a pair of wheels. The two wheel frames are rotatable between a field operation position and a road transport position.

Another embodiment of the present disclosure relates to a header of a harvesting machine. The header includes two pairs of wheels and two wheel frames. Each wheel frame is connected to a pair of wheels. The two wheel frames are rotatable between a field operation position and a road transport position.

Another embodiment of the present disclosure relates to a method of converting a header of a harvesting machine from a field operation mode to a road transport mode. The method includes: releasing wheel frames of the header from the header; rotating the wheel frames from a field operation position to a road transport position; and enabling kingpin steering connections between at least one of the wheel frames and a pair of wheels.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements, throughout. In the drawings, like reference numbers generally indicate identical, functionally similar, and/or structurally similar elements.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations.

The present disclosure provides systems and methods for road transporting a header of a harvesting machine between different field sites according to some embodiments. The road transport systems enable the header to be transported using the ground wheels of the header without using a trailer according to some embodiments. The road transport systems enable transition of the header between a field operation mode and a road transport mode according to some embodiments. When the header is in the field operation mode, the ground wheels of the header are in a field operation direction to support the header under field operation according to some embodiments. When the header is switched to the road transport mode, the ground wheels of the header are turned to a road transport direction to transport the header according to some embodiments. The road transport systems include a kingpin steering system installed in at least two of the ground wheels, which allows the ground wheels to steer the vehicle when the header is under the road transport mode according to some embodiments.

Figure 1:
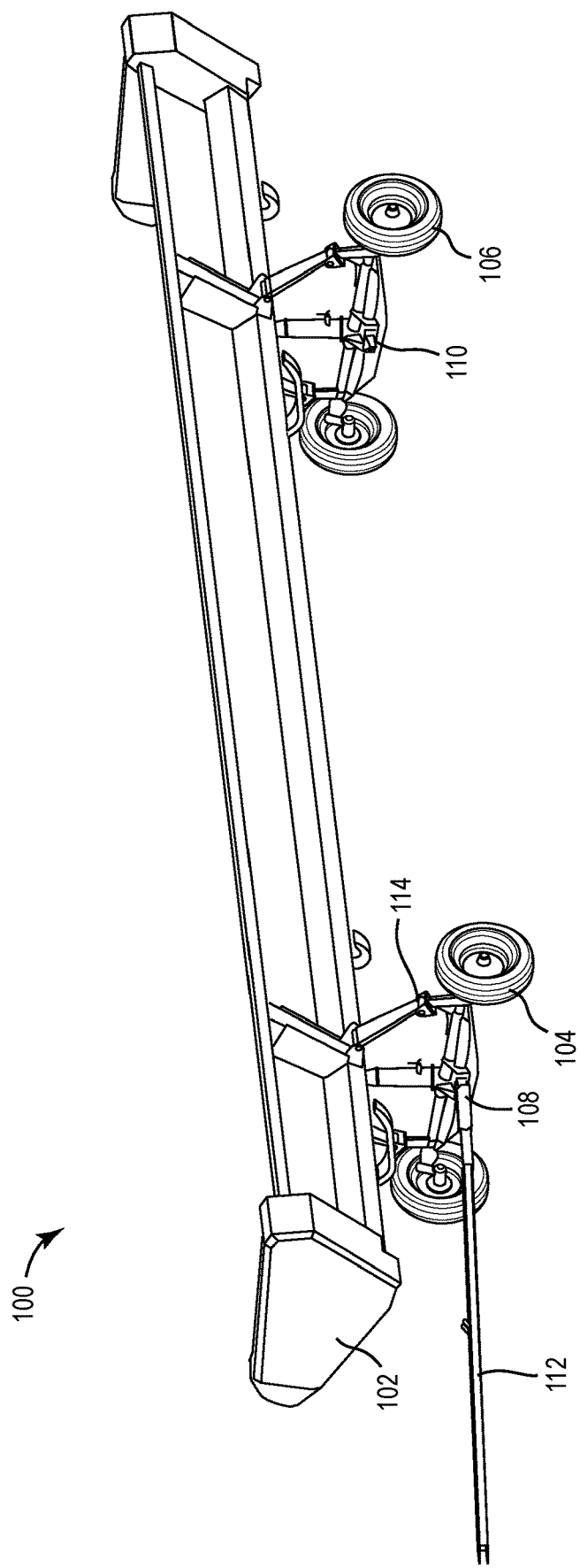
FIG. 1 is a diagram depicting a transport system for a header of a harvesting machine is illustrated according to some embodiments

Referring now to FIG. 1, a diagram of a transport system 100 for a header 102 of a harvesting machine (e.g., a combine) is illustrated according to some embodiments. The harvesting machine includes the header 102 and two pairs of ground wheels 104 and 106 according to some embodiments. The two pairs of the ground wheels 104 and 106 are installed in two wheel frames 108 and 110 according to some embodiments. The wheel frames 108 and 110 are connected to the header 102 to support the header 102 according to some embodiments. The wheel frames 108 and 110 support each pair of ground wheels, respectively, and define a distance between two wheels of each pair of ground wheels 104 and 106 according to some embodiments. In some embodiments, the wheel frame 108 and the wheel frame 110 have same size of frame. In some embodiments, the wheel frame 108 has a smaller width compared to the wheel frame 110. In some embodiments, the wheel frame 108 is connected to the pair of wheels 104 through a kingpin steering system 114. In some embodiments, the wheel frame 110 does not include a steering system and the connection between the wheel frame 110 and the pair of wheels 106 is different from the connection between the wheel frame 108 and the pair of wheel 104. In some such embodiments, the pair of wheels 104 are the front wheels and the pair of wheels 106 are back wheels when the road transport system 100 is in the road transport mode. In some embodiments, the wheel frames 108 and 110 both include kingpin steering systems and either pair of wheels 104 or 106 can be used as front wheels for road transport.

The wheel frame 108 is connected to a tow arm 112 according to some embodiments. The tow arm 112 is used for connecting the transport system 100 to a tow vehicle according to some embodiments. The pair of wheels 104 are installed in the wheel frame 108 through the kingpin steering system 114 according to some embodiments. The wheel frame 108 and wheel frame 110 can be rotated according to some embodiments. When the wheel frames 108 and 110 are rotated to a longitudinal direction (not shown) along the header 102, the road transport system 100 is in the field operation mode according to some embodiments. While the road transport system 100 is in the field operation mode, the kingpin steering system 114 is disabled by locking the kingpin connection according to some embodiments. When the wheel frames 108 and 110 are rotate 90 degrees to a transverse direction as shown in FIG. 1, the road transport system 100 is in the road transport mode according to some embodiments. While the road transport system 100 is in the road transport mode, the kingpin steering system 114 is enabled by unlocking the kingpin connection according to some embodiments. The tow arm 112 is connected to the wheel frame 108 when the road transport system 100 is in the road transport mode and is disconnected from the wheel frame 108 when the road transport system 100 is in the field operation mode according to some embodiments.

Figure 2:
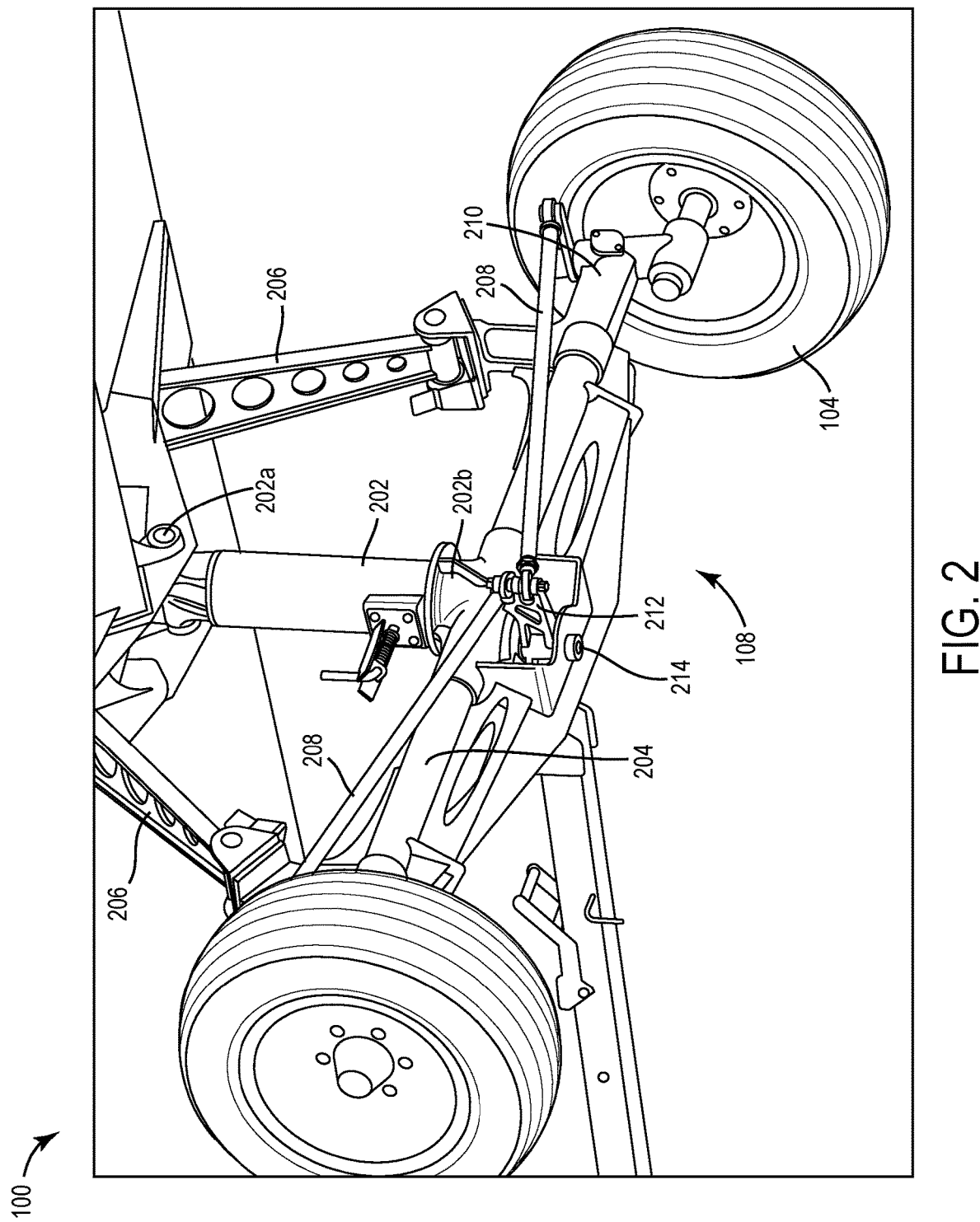
FIG. 2 is a diagram depicting the road transport system of FIG. 1 according to some embodiments.

FIG. 2 is a diagram of the road transport system 100 of FIG. 1 according to some embodiments. The wheel frame 108 includes a vertical axle 202 connected to the header 102 according to some embodiments. The vertical axle 202 can be rotated for switching the road transport system 100 between the road transport mode and field operation mode according to some embodiments. The wheel frame includes a horizontal axle 204 that is connected to the vertical axle 202 at a middle point of the horizontal axle 204 according to some embodiments. A top end 202a of the vertical axle 202 has a first rotatable connection with the header 102, which enables the vertical axle 202 to switch between a road transport position and a field operation position according to some embodiments. A bottom end 202b of the vertical axle 202 has a second rotatable connection with the horizontal axle 204, which enables the horizontal axle 204 to switch between a road transport position and a field operation position according to some embodiments. When the road transport system 100 is in the road transport mode as shown in FIG. 2, the vertical axle 202 is rotated at the end connection 202a to the road transport position and horizontal axle 204 is rotated at the end connection 202b to the road transport position according to some embodiments. The wheel frame 108 includes two struts 206 for fixing the horizontal axle 204 in the road transport position or in the field operation position according to some embodiments. When the fixing beams are connected to the header, a relative position between the horizontal axle 204 and the vertical axle 202 is fixed and the connection 202b between the axles 202 and 204 cannot be rotated or moved according to some embodiments.

The horizontal axle 204 is connected to the pair of wheels 104 at each end of the axle 204 through a kingpin steering system 114 according to some embodiments. The kingpin steering system 114 enables the pair of wheels 104 to rotate with respect to the horizontal axle 204 and the vertical axle 202 according to some embodiments. The kingpin steering system 114 enables the wheels that is connected to the wheel frame 108 to rotate or turn in order to steer the header 102 in a turning direction of the tow vehicle according to some embodiments. The kingpin steering system 114 enables separating the rotation of the wheels 104 from the rotation of the wheel frame 108 so that the header is more stable during turning in road transport according to some embodiments. For example, when the tow vehicle turns, the kingpin steering system responds to the turning and allows the wheels 104 to rotate in response to the turning, and enables the wheel frame 108 to delay responding to the turning according to some embodiments. In this way, the header 102 does not make sharp and quick turns so that the transport of the header 102 is much more stable.

The kingpin steering system 114 includes a spindle 210 at each end of the horizontal axle 204. A wheel axle of each wheel 104 is connected to the spindle 210 according to some embodiments. The kingpin steering system 114 also includes two steering tie rods 208 connecting between each spindle 210 and a frame mount 212 according to some embodiments. The frame mount 212 is located at the middle point of the horizontal axle 204 according to some embodiments. The frame mount 212 is connected to the steering tie rods 208 at one end and connected to the tow arm 112 at the other end according to some embodiments. The frame mount 212 is connected to the horizontal axle 204 via a pin 214 that allows the frame mount 212 to rotate along with the tow arm 112 according to some embodiments. For example, when the tow vehicle turns, the tow arm 112 turns along with the tow vehicle according to some embodiments. The frame mount 212 also turns along with the tow arm 112 via the pin connection 214 according to some embodiments. When the frame mount turns 212, the steering tie rod 208 moves and pushes or pulls the spindles 210 to turn the wheels 104 according to some embodiments. In this way, the steering system 114 moves the wheels to make turns according to some embodiments. The steering system 114 enables the wheels 104 to move along with the tow arm 112 and turn independently from the wheel frame 108 according to some embodiments. The kingpin steering system 114 enables rotation of the wheels 104 with respect to the vertical axis and the horizontal axle 204 according to some embodiments. In some embodiments, the horizontal axle 204 has a desired length in order to increase the stability in road transport according to some embodiments.

Figure 3A:
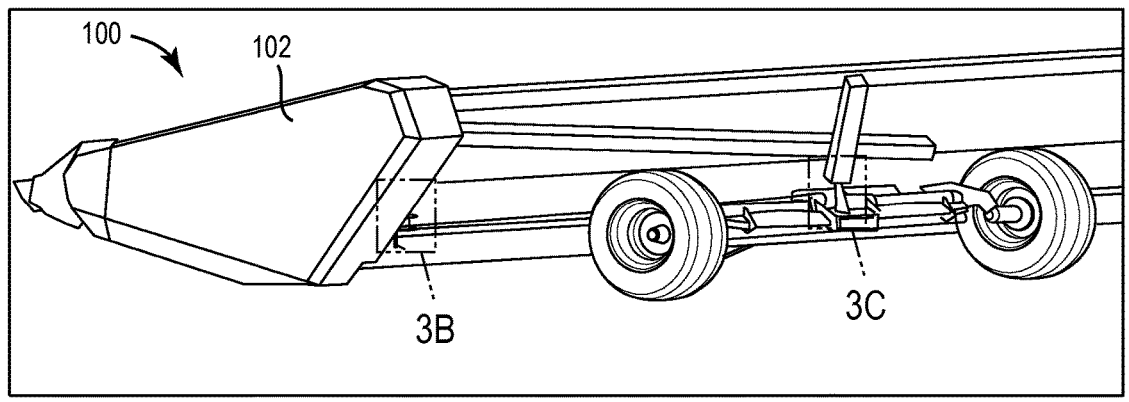
FIGS. 3A-C are diagrams depicting the road transport system of FIG. 1 according to some embodiments.
Figure 3B:
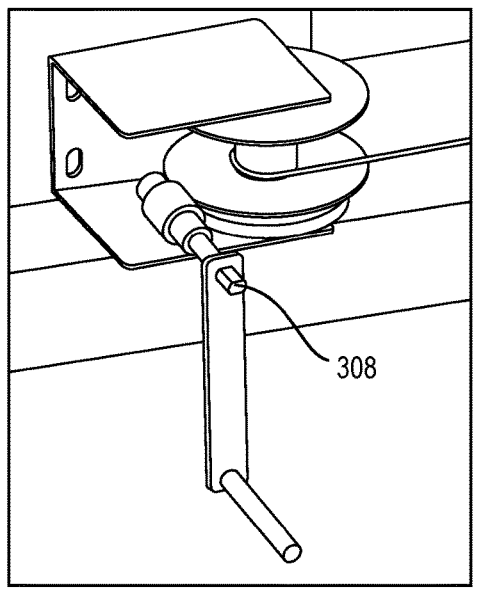
Figure 3C:
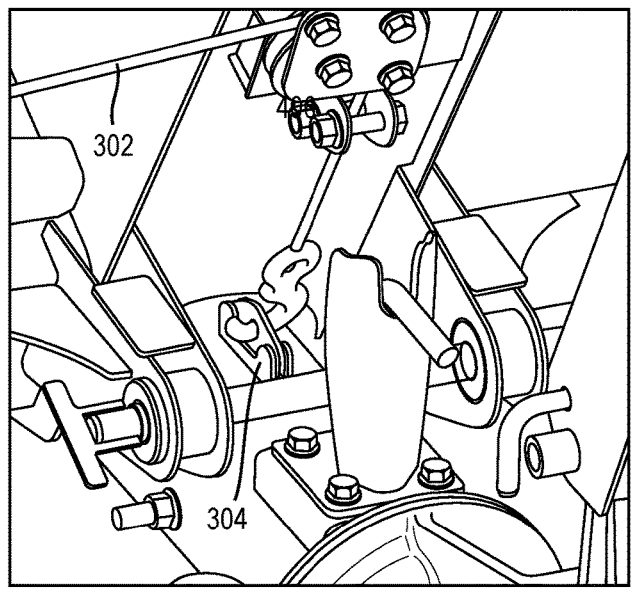

FIGS. 3A-C are diagrams of the road transport system 100 of FIG. 1 according to some embodiments. The road transport system 100 includes a hooking system including a cable hook 302 and a spinning component 308 according to some embodiments. When the road transport system 100 converts from the field operation mode to the road transport mode, in order to rotate the wheel frame 108 from the field operation position to the road transport position, the road transport system 100 raises the header 102 so that the ground wheels 104 are lifted from the ground according to some embodiments. When the header 102 raises, the weight load from the wheel frame 108 and the wheels 104 are on the pin connection 202a between the wheel frame 108 and the header 102 according to some embodiments. In order to reduce load on the pin connection 202a, the road transport system 100 utilizes the hooking system to hook the wheel frame 108 to the header 102. The hooking system can use any suitable hooking mechanisms (e.g., a pulley system according to some embodiments. The wheel frame 108 includes a hook receiver 304 located on the surface of the vertical axle 202 according to some embodiments. When the header 102 is raised up, one end of the cable hook 302 is connected to the hook receiver 304 and the other end of the cable hook 302 is connected to a spinning component 308 to through one or more pulleys according to some embodiments. The cable hook 302 can be tied and/or released using the spinning component 308 according to some embodiments. When the vertical axle 202 rotates from the field operation position to the road transport position, the cable hook 302 is slowly released via the spinning component so that the wheel frame 108 is slowly lowered to the ground according to some embodiments.

Figure 4A:
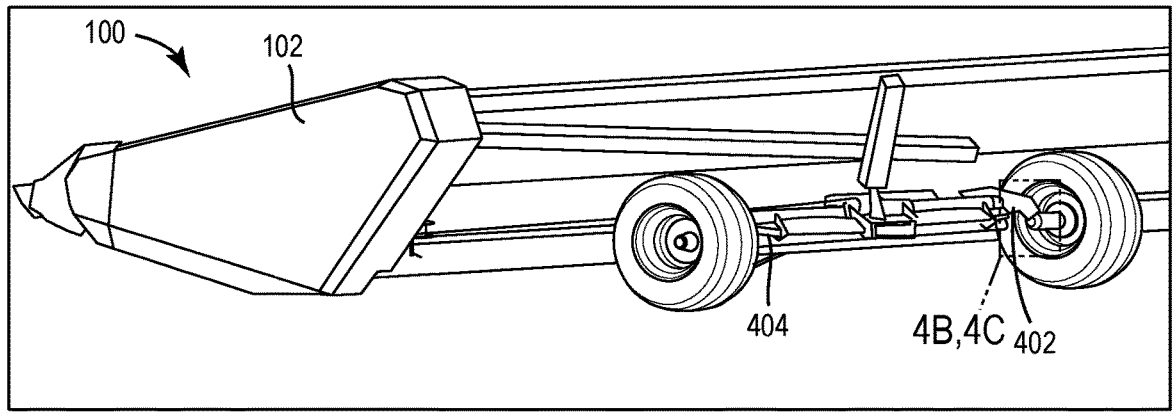
FIGS. 4A-C are diagrams depicting the road transport system of FIG. 1 according to some embodiments.
Figure 4B:
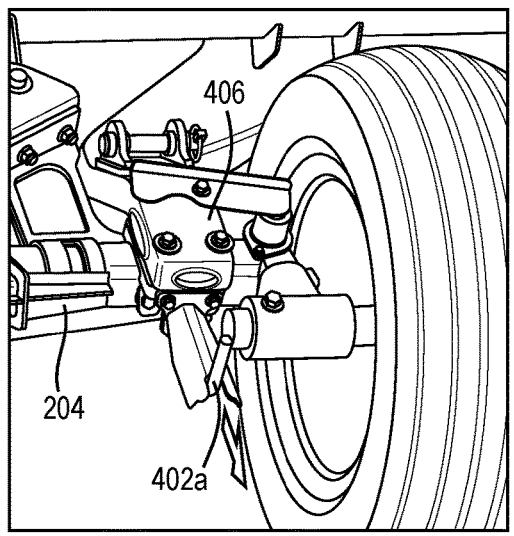
Figure 4C:
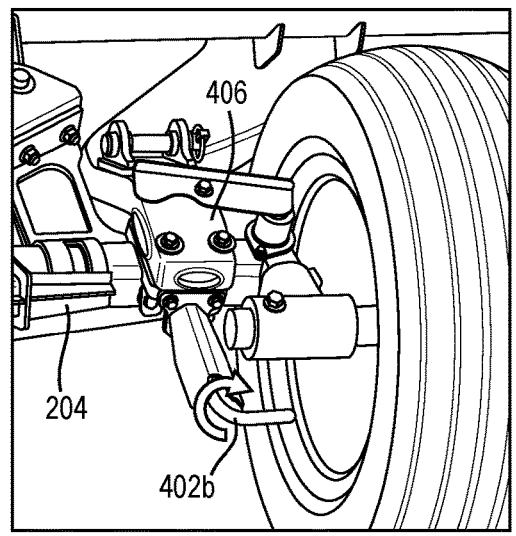

FIGS. 4A-C are diagrams of the road transport system 100 of FIG. 1 according to some embodiments. When the road transport system 100 is in the field operation mode, the wheel frame 108 is latched to a support beam 406 of the header 102 via two pins 402 and 404. When the road transport system 100 switches from the field operation mode to the road transport mode, the wheel frame 108 is unlatched from the support beam 406 according to some embodiments. The pins 402 and 404 are located at each end of the horizontal axle 204 according to some embodiments. When the pins 402 and 404 are located at a latch position (e.g., the 402a position, the wheel frame 108 is latched to the support beam 406 according to some embodiments. When the pins 402 and 404 are located at an unlatched position (e.g., the 402b position, where the pin 402 is pulled out and turned over, the wheel frame 108 is unlatched from the support beam 406 according to some embodiments.

Figure 5A:
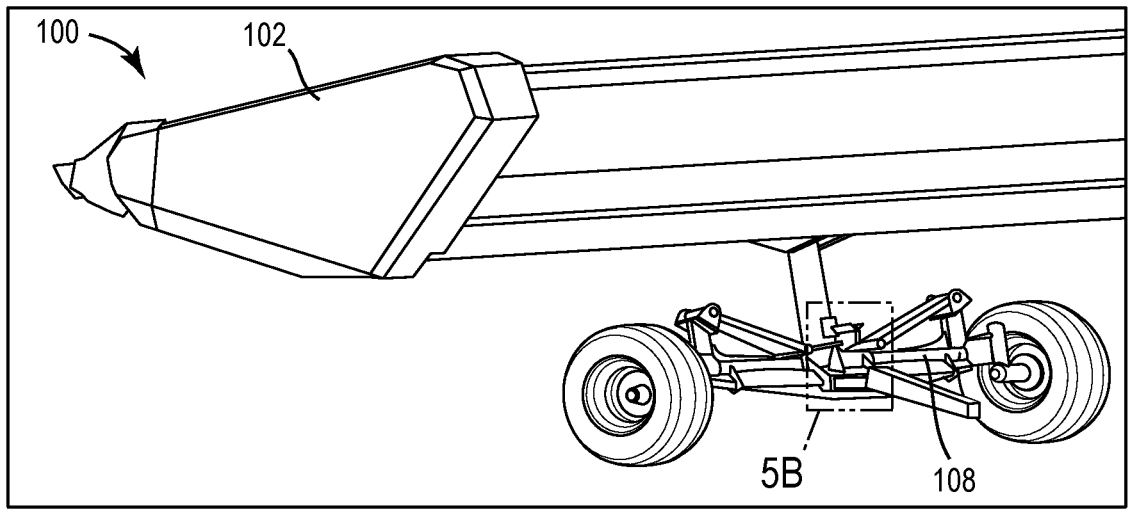
FIGS. 5A-B are diagrams depicting the road transport system of FIG. 1 according to some embodiments.
Figure 5B:
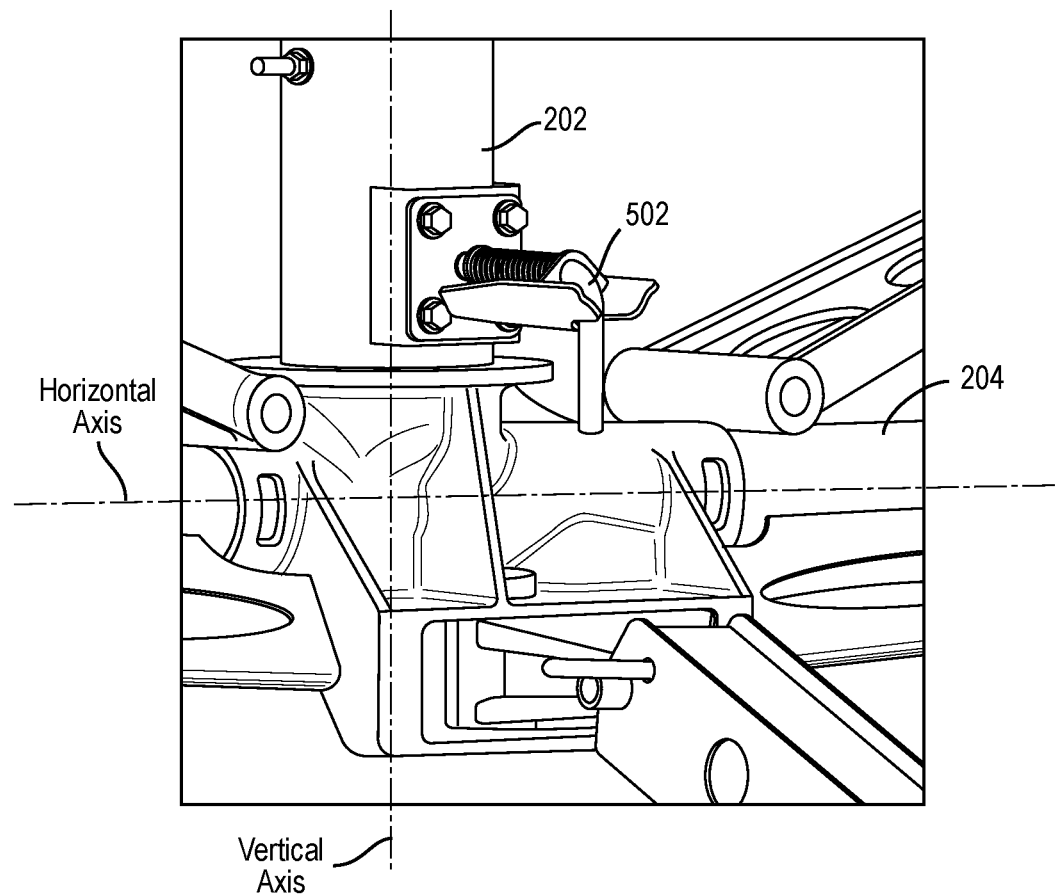

FIGS. 5A-C are diagrams of the road transport system 100 of FIG. 1 according to some embodiments. The road transport system 100 includes a pin 502 for enabling and disabling rotation between the vertical axle 202 and the horizontal axle 204 according to some embodiments. When the pin 502 is pushed in, the rotational connection between the vertical axle 202 and the horizontal axle 204 is locked to a fixed connection, so that the horizontal axle 204 is not rotatable along the vertical axis according to some embodiments. When the pin 502 is pulled out, the rotational connection between the vertical axle 202 and the horizontal axle 204 is unlocked to be rotatable, so that the horizontal axle 204 can be rotated along the vertical axis according to some embodiments. When the road transport system 100 switches between road transport and field operation modes, the pin 502 is pulled out, and the wheel frame 108 is rotated along the vertical axis between road transport and field operation positions according to some embodiments. When the road transport system 100 is in either the road transport mode or the field operation mode, the pin 502 is pushed in and the wheel frame 108 is no longer rotatable along the vertical axis according to some embodiments.

Figure 6A:
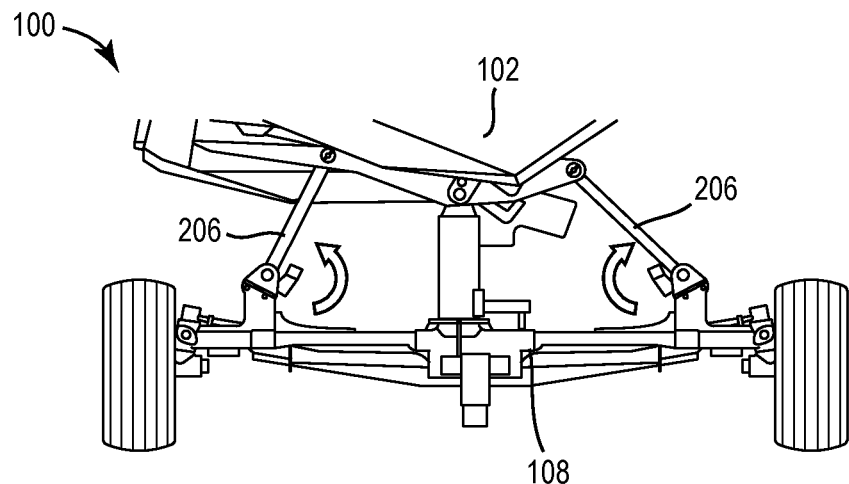
FIGS. 6A-C are diagrams depicting the road transport system of FIG. 1 according to some embodiments.
Figure 6B:
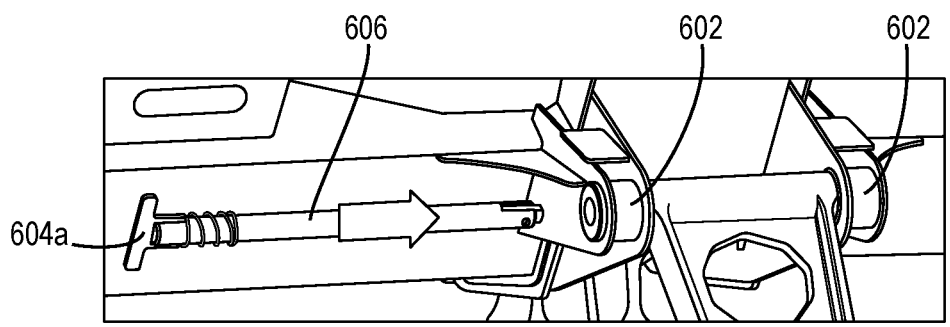
Figure 6C:
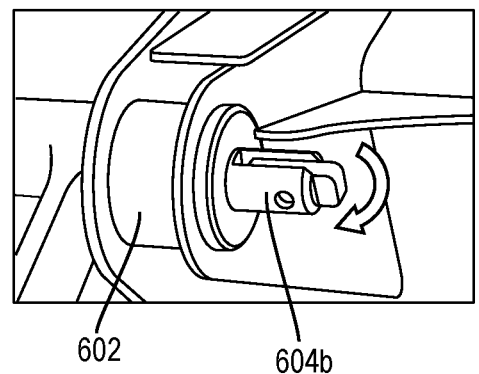

FIG. 6A-C are diagrams of the road transport system 100 of FIG. 1 according to some embodiments. When the wheel frame 108 is rotated from the field operation position to the road transport position during switching of the road transport system 100 from the field operation mode to the road transport mode, the struts 206 are rotated up into main frame mounts 602 of the header 102 according to some embodiments. Pins 604 are then installed through both the frame mounts 602 and the struts 206 according to some embodiments. One end of the pin 604 has a fixed stopper 604a and the other end of the pin 604 has a rotatable keeper 604b according to some embodiments. In some embodiments, a spring 606 is installed at the fixed stopper end 604a to tighten the pin to the mounts 602 according to some embodiments. In some embodiments, any suitable tightening mechanisms can be used according to some embodiments. The rotatable keeper 604b is rotated to a longitudinal position along the pin 604 when inputting the pin 604 through the frame mounts 602 and the struts 206, and is rotated 90 degrees after going through to keep the pin locked into the frame mounts 602 and the struts 206 according to some embodiments.

Figure 7A:
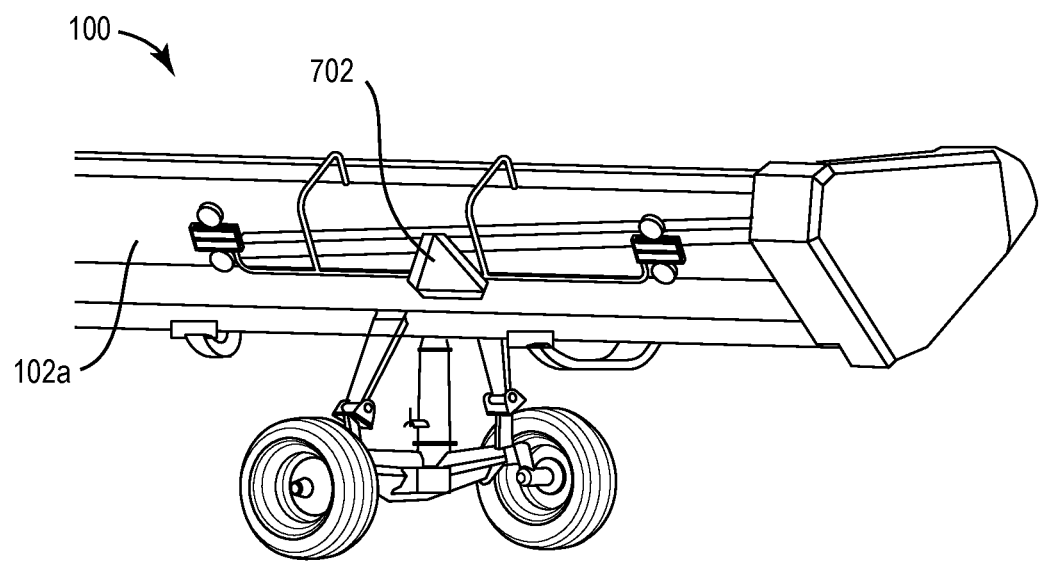
FIGS. 7A-B are diagrams depicting the road transport system of FIG. 1 according to some embodiments.
Figure 7B:
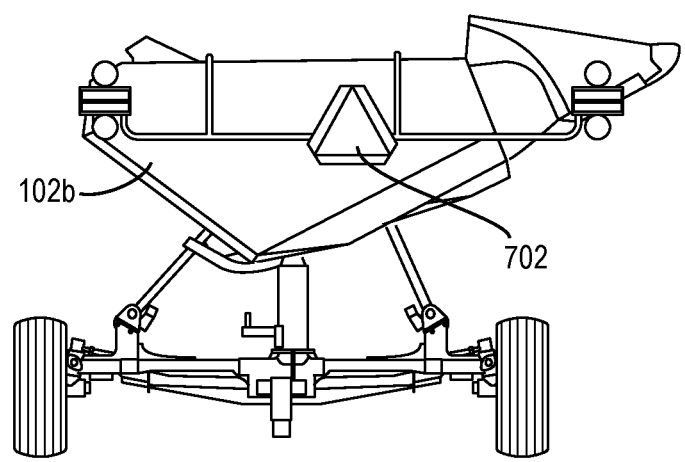

FIG. 7A-C are diagrams of the road transport system 100 of FIG. 1 according to some embodiments. The road transport system 100 includes a light bar 702 installed on the header 102 according to some embodiments. The light bar 702 is located on a first side of the header 102a when the road transport system 100 is in the field operation mode according to some embodiments. The light bar 702 is relocated on a second side of the header 102b when the road transport system 100 is in the road transport mode according to some embodiments. In some embodiments, the light bar 702 can be install on the header using any suitable mounting and/or fastening mechanisms, such as using R-clips, pins, etc.

Figure 8A:
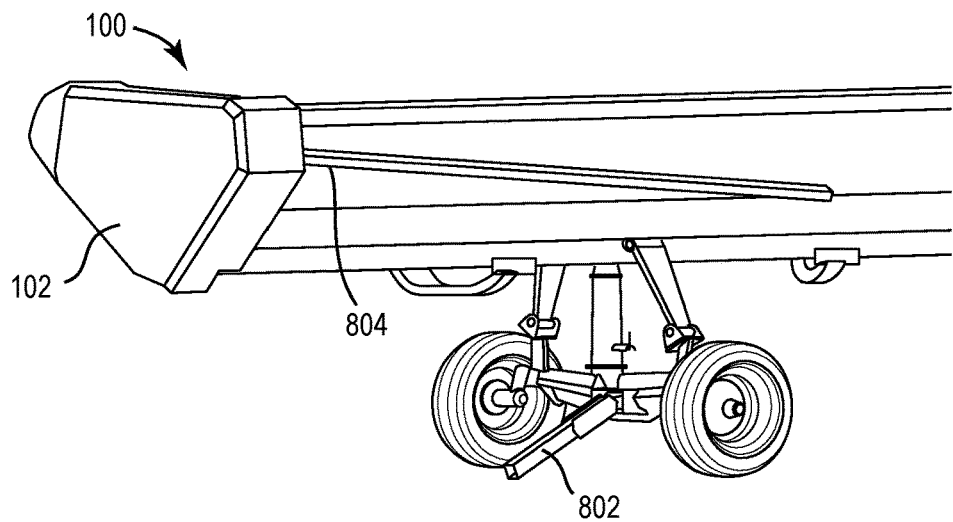
FIGS. 8A-C are diagrams depicting the road transport system of FIG. 1 according to some embodiments.
Figure 8B:
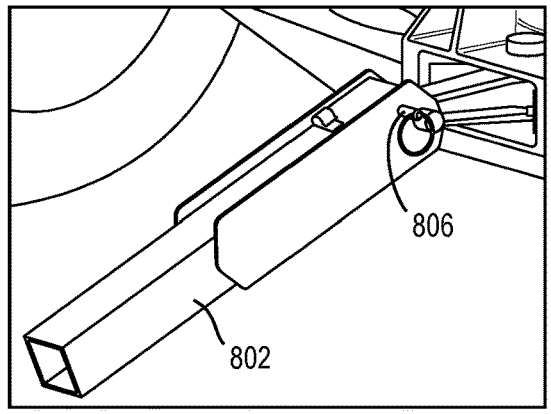
Figure 8C:
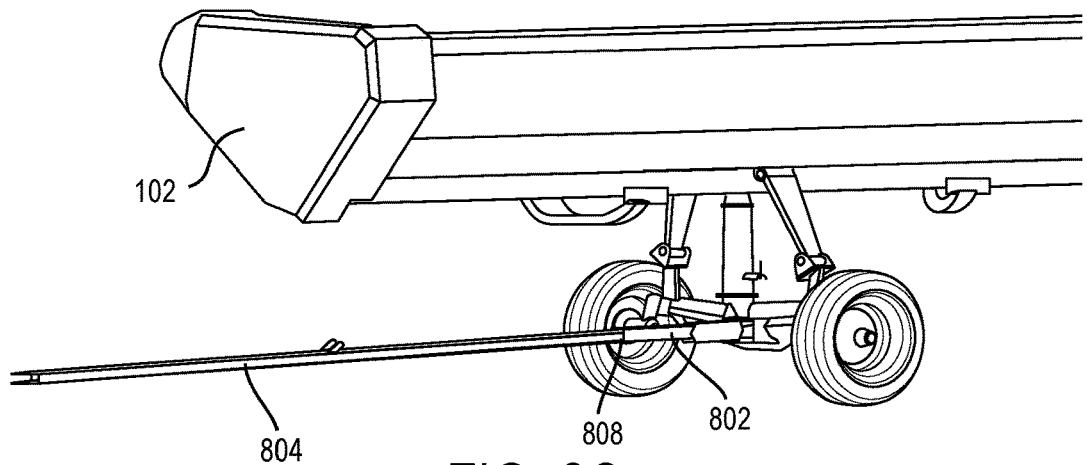

FIG. 8A-C are diagrams of the road transport system 100 of FIG. 1 according to some embodiments. The tow beam 112 includes a rear beam part 802 attached to the wheel frame 108 and an extension beam part 804 stored on the header during the field operation according to some embodiments. When the road transport system 100 is switched to the road transport mode, the extension beam part 804 is taken out from the header 102 and connected to the rear beam part 802 according to some embodiments. A storage pin is located on the rear beam part 802 and used for securing the connection between the rear beam part 802 and the extension beam part 804 according to some embodiments.

Figure 9:
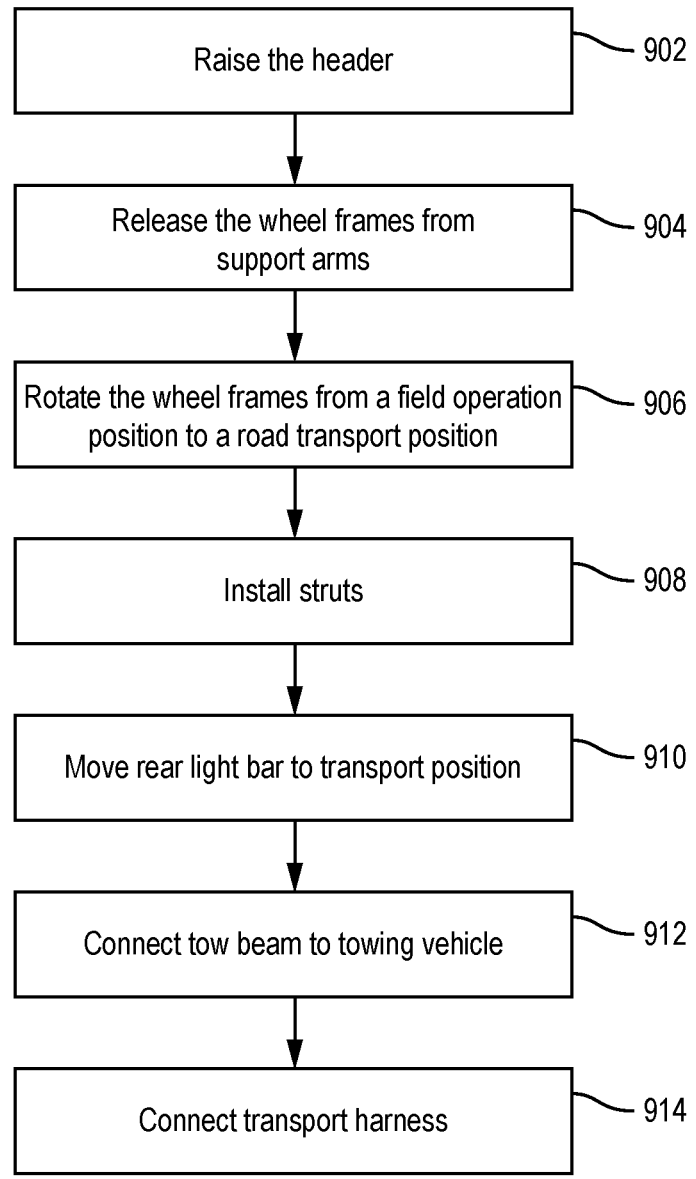
FIG. 9 is a flow diagram depicting a process of converting a road transport system of a header from a field operation mode to a road transport mode according to some embodiments.

FIG. 9 is a flow diagram of a process of converting a road transport system 100 of a header 102 from a field operation mode to a road transport mode according to some embodiments. The header 102 includes two pair of wheels 104 and 106 installed on two wheel frames 108 and 110 according to some embodiments. At operation 902, the header 102 is raised so that the wheels 104 and 106 of the header 102 are lifted up from the ground according to some embodiments. In some embodiments, raising the header 102 includes attaching a cable hook 304 from the header 102 to each wheel frame 108 and 110 in order to reduce load on the connecting pins between the wheel frames 108 and 110 and the header 102.

At operation 904, the wheel frames 108 and 110 are released from support arms 406 of the header 102 according to some embodiments. In the field operation mode, a horizontal axle of each wheel frame 108 and 110 is latched to a support arm 406 of the header 102 according to some embodiments. Releasing the wheel frames 108 and 110 from the support arms 406 includes unlatching the horizontal axles 204 from the support arms 406 and slowly lowering the wheel frames 108 and 110 until the wheels 104 and 106 touching the ground using the cable hook 302 according to some embodiments. Lowering the wheel frames 108 and 110 includes rotating a vertical axle 202 of the wheel frame 108 via a rotatable connection between the vertical axle 202 and the header 102 according to some embodiments.

At operation 906, rotating the wheel frames 108 and 110 from a field operation position to a road transport position includes rotating the vertical axle 202 of each wheel frame along a vertical axis 90 degrees to the road transport position according to some embodiments. In the filed operation position, the wheel frames 108 and 110 are located longitudinally along the header 102 according to some embodiments. In the road transport position, the wheel frames 108 and 110 are located transversely to the header 102 according to some embodiments.

At operation 908, installing struts 206 includes installing struts 206 from each end of the horizontal axle 204 of each wheel frame 108 and 110 into a frame mount 602 and installing a pin 606 through both the frame mount 606 and the strut 206 according to some embodiments.

At operation 910, moving rear light bar 702 to a transport position includes moving the rear light bar 702 from a first side 102a of the header 102 to a second side 102b of the header 102 according to some embodiments. In some embodiments, moving the rear light bar 702 includes removing one or more R-clips and pins, lifting the light bar out of storage tubes, moving the light bar 702 over to the second side 102b of the header, and slid mounting plate over an end shield rear pin according to some embodiments.

At operation 912, connecting a tow beam 802 of the header to a towing vehicle includes lifting an extension tow beam part 804 from a beam storage location, connecting a rear tow beam part 802 to a first end of an extension tow beam part 804, and connecting a second end of the extension tow beam part 804 to the towing vehicle according to some embodiments.

At operation 914, connecting transport harness includes inserting a transport connector into a header connector and inserting cable in J-hooks to secure to the tow beam according to some embodiments.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Although the present disclosure is illustrated by the example of a header of a harvest machine, the present disclosure may be applied to various machines that are similar to the header of a harvest machine that need to be transported between different field sites.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

What is claimed is:

1. A road transport system of a header of a harvesting machine, comprising:
   two pairs of wheels;
   two wheel frames, each of the two wheel frames connected to one of the two pairs of wheels, wherein the two wheel frames are rotatable between a field operation position and a road transport position, wherein each of the two wheel frames includes a vertical axle and a horizontal axle, wherein a first end of the vertical axle is connected to the header and a second end of the vertical axle is connected to a middle point of the horizontal axle; and
   a steering system connected between at least one of the two pairs of wheels and a corresponding wheel frame, the steering system including a kingpin connection between each wheel and an end of the horizontal axle of the corresponding wheel frame.

2. The road transport system of claim 1, wherein the kingpin connection comprises a kingpin connected to the middle point of the horizontal axle via a steering tie rod.

3. The road transport system of claim 1, wherein connection between the second end of the vertical axle and the middle point of the horizontal axle is rotatable along a vertical axis.

4. The road transport system of claim 3, wherein the connection is rotated 90 degrees from the field operation position to the road transport position.

5. The road transport system of claim 1, wherein each of the two wheel frames includes two struts, each strut connected between an end of the horizontal axle and the header.

6. A header of a harvesting machine, comprising:
   two pairs of wheels; and
   two wheel frames, each wheel frame connected to one of the two pairs a pair of wheels and including a vertical axle and a horizontal axle, wherein a first end of the vertical axle is connected to the header and a second end of the vertical axle is connected to a middle point of the horizontal axle, wherein the two wheel frames are rotatable between a field operation position and a road transport position;
   wherein each of the two wheel frames includes two struts, each strut connected between an end of the horizontal axle and the header.

7. The header of claim 6, further comprises a steering system connected between at least one of the two pairs of wheels and a corresponding wheel frame.

8. The header of claim 7, wherein the steering system includes a kingpin connection between each wheel and an end of the horizontal axle of the corresponding wheel frame.

9. The header of claim 8, wherein the kingpin connection comprises a kingpin connected to the middle point of the horizontal axle via a steering tie rod.

10. The header of claim 6, wherein connection between the second end of the vertical axle and the middle point of the horizontal axle is rotatable along a vertical axis.

11. The header of claim 10, wherein the connection is rotated 90 degrees from the field operation position to the road transport position.

12. A method of converting a header of a harvesting machine from a field operation mode to a road transport mode, comprising:
   releasing wheel frames of the header from the header;
   rotating the wheel frames from a field operation position to a road transport position;
   enabling kingpin steering connections between at least one of the wheel frames and a pair of wheels;
   connecting a strut between each end of a horizontal axle of a wheel frame to the header; and
   connecting a tow beam of the at least one of the wheel frames to a towing vehicle.

13. The method of claim 12, wherein rotating the wheel frames from the field operation position to the road transport position comprises disengaging a pin of each of the wheel frames to allow the wheel frames to rotate about a vertical axis.

14. The road transport system of claim 1, wherein the road transport system is configured to raise the header of the harvesting machine to lift one of the two pairs of wheels for transitioning the two wheel frames between the field operation position and the road transport position.

15. The road transport system of claim 14, wherein the road transport system comprises a hooking system configured to raise and lower the header.

16. The road transport system of claim 15, wherein the hooking system is configured to reduce an amount of load applied to the vertical axle.

17. The road transport system of claim 1, further comprising a tow arm configured to couple the road transport system with a tow vehicle.

18. The header of claim 6, wherein the header is configured to be raised to lift one of the pairs of wheels for transitioning the two wheel frames between the field operation position and the road transport position.

19. The header of claim 6, further comprising a tow arm configured to couple the header with a tow vehicle.

* * * * *